July 30, 1940.　　　T. C. FLANAGAN ET AL　　　2,209,517
CHANGEABLE EXHIBITOR
Filed July 19, 1938　　　3 Sheets-Sheet 1

Inventors.
Thomas C. Flanagan & Arthur D. Fell.
By Paul O. Pippel
Atty.

July 30, 1940. T. C. FLANAGAN ET AL 2,209,517
CHANGEABLE EXHIBITOR
Filed July 19, 1938 3 Sheets-Sheet 2

Inventors.
Thomas C. Flanagan & Arthur D. Fell
By Paul O. Pippel
Att'y.

July 30, 1940.  T. C. FLANAGAN ET AL  2,209,517
CHANGEABLE EXHIBITOR
Filed July 19, 1938    3 Sheets-Sheet 3

Inventors.
Thomas C. Flanagan & Arthur D. Fell.
By Paul O. Pippel
Att'y.

Patented July 30, 1940

2,209,517

UNITED STATES PATENT OFFICE 2,209,517

CHANGEABLE EXHIBITOR

Thomas C. Flanagan and Arthur D. Fell, Chicago, Ill., assignors to Community Educational Clubs, Inc., Chicago, Ill., a corporation of Illinois Application July 19, 1938, Serial No. 219,970

5 Claims. (Cl. 40—36)

The invention relates to a changeable exhibitor, the same having especial utility in the intermittent display of cards, pictures, signs, and the like behind a display opening for advertising or other purposes.

The main object of the invention is to provide an improved changeable exhibitor of simple, inexpensive construction, which will function efficiently and not get out of order.

Another object is to provide an improved conveyer mechanism for supporting a pack of signs, from which mechanism the signs are taken to be moved individually into a display position and thereafter returned to the opposite end of said pack on the said mechanism.

Another object is to provide such conveyer and support disposed on an incline so that the signs may be removed from the lower end thereof and returned to the higher end thereof.

Still another object is to provide a brake mechanism for said conveyer and supporting mechanism to keep the weight of the pack of signs stored thereon from accidentally slipping said conveyer.

Another object is to provide an improved sign display conveyer and sign carrier members thereon, plus improved guide means to insure proper handling of the signs.

It is also an object to provide an improved driving means and timing means for handling and moving the signs to and from a display position.

Other important objects will become known as the disclosure is more fully made.

A practicable example of the invention is shown in the drawings, the same comprising an upright cabinet having a front wall provided with a display window or opening, the cabinet further having two oppositely disposed end walls. These end walls respectively carry alined, inclined conveyer chains, the links of which carry means for removably receiving portions on opposite ends of the signs. Thus the signs are supported in a hanging manner and spaced in a flat-wise pack, a brake mechanism being operatively associated with said inclined supporting chains to keep the weight of the sign pack from slipping the chains. Other chains are respectively disposed on the opposite walls, the same being provided with improved sign carriers and driven in a manner with respect to the support to pick up a sign from the lower end of the pack and move it past the display opening, means being provided to hold the sign at the display opening for a predetermined interval. These other chains are endless and so disposed that they eventually restore the displayed signs to the higher end of the sign pack on the first mentioned chains. The signs may thus be displayed in sequence as they always are maintained in the same order or relative position in the pack on the support chains. Suitable guide means is provided to insure proper display and handling of the signs. So much will suffice in giving a general understanding of the improved changeable exhibitor.

An appropriate cabinet 10 is provided having a front vertical wall 11 formed with a window, or display opening 12, said cabinet having opposite, vertical end walls 13. The purpose of the exhibitor mechanism to be described is to take signs, or the like, from a storage means and display them successively behind the opening 12.

Figure 2:
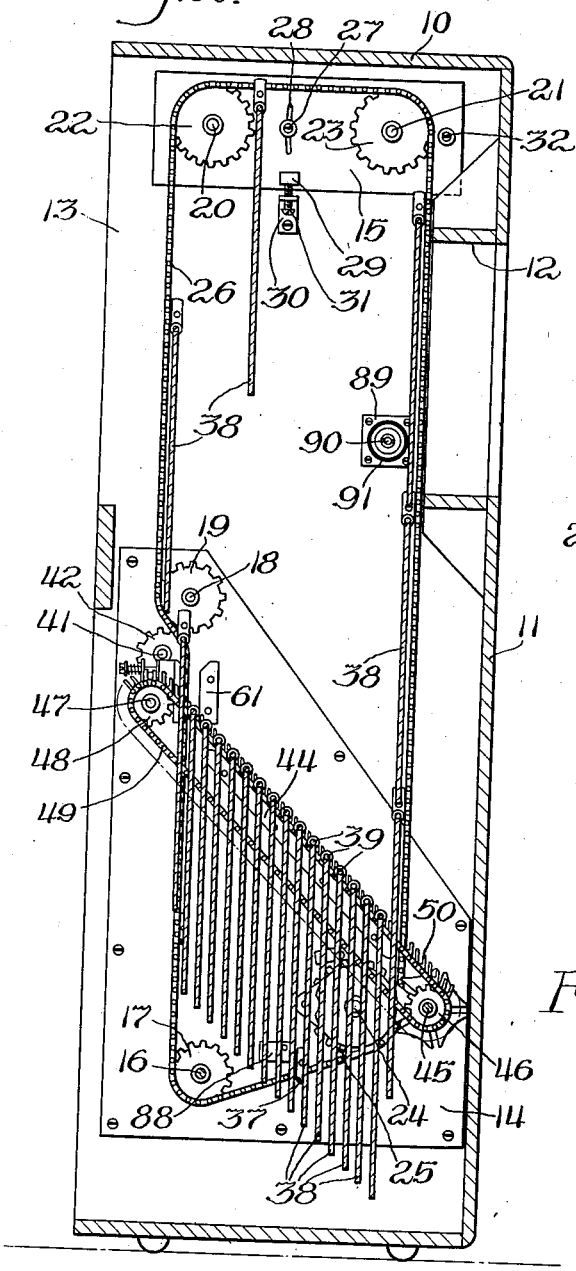
Figure 2 is an enlarged side sectional view of the sign handling mechanism taken along the line 2—2 of Figure 1, looking in the direction of the arrows.

Each side wall 13 of the cabinet has its lower inside portion provided with a support plate 14, shaped as shown in Figure 2. Smaller, upper support plates 15, one on each wall, are also provided. Across the lower end of the plates 14 is suitably journaled a transverse, horizontal, main drive shaft 16 which is driven from any suitable source of power to turn said shaft 16. At each end said shaft carries a sprocket wheel 17. The upper rear portion of the plates 14 carry parallel transverse alined stub shafts 18 on each of which is an idler sprocket wheel 19. The shafts 18 are offset rearwardly of the shaft 16, it is to be noted.

The top plates 15 carry transversely alined rear stub shafts 20 and front parallel stub shafts 21, said shafts carrying respectively rear sprocket idler wheels 22 and front idler wheels 23. Further, the lower plates 14 carry transversely alined stub shafts 24 each of which carries respective idler sprocket wheels 25. It can now be seen that each wall 13 is provided with a set of sprocket wheels 17, 19, 22, 23 and 25. Around each such set of wheels is trained a roller type of sprocket chain 26. These two chains mentioned are the same and constitute the conveyer chains for displaying the signs as will shortly appear. These chains 26 run in a direction to move that run of the chain next the front wall 11 upwardly to carry signs past the window 12 as indicated in Figure 2.

The upper plates 15 are secured to their respective adjacent walls 13 by screws 27 passed through respective arcuate slots 28 formed in the said plates. Each plate further is formed with a laterally extending boss 29 and below these bosses each wall 13 carries respectively a bracket 30 and screw bolt 31. It is plain that when the screws 27 are loosened the bolts 31 may be operated to swing the plates 15 about a securing screw 32 to move the shaft centers 20 and 21 and thereby tension the chains 26 respectively to keep them in proper running condition.

Figure 6:
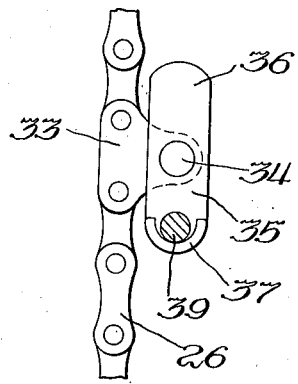
Figure 6 is a detail, enlarged end elevational view of a part of one of the sign display and carrier chains with a sign carrier member thereon.

The inside bar of certain links of the chains 26 is of special triangular shape as shown at 33, the same extending away from the chain and at its apex carrying a pivot pin 34 to which is pivotally connected a pendant carrier member 35 which hangs vertically and has an upper lightweight tail portion 36 and a lower weighted portion forming an outstanding horizontal, rounded carrier or saddle portion 37. Each chain 26 at intervals is provided with these carrier members and it will be understood that on opposite chains 26 they will be transversely alined to cooperate in carrying the signs. The pivot structure and weight distribution of these carriers 35 is such that they tend normally to hang in the position shown in Figures 6 and 7.

Figure 7:
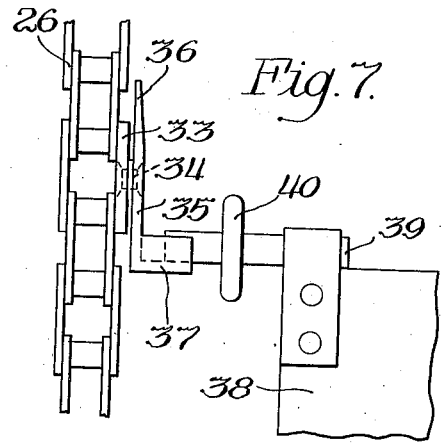
Figure 7 is a detail face view of the chain structure shown in Figure 6.

The signs may comprise suitable rectangular sheets 38 of a size best to cooperate with the size of the opening 12 behind which they are to be displayed. Each sign includes a carrier rod 39 to which the sign or sign frame is connected, said rod having its opposite ends projecting as shown in Figure 7 so that said ends may respectively rest loosely in the saddles or carrier portions 37. Each rod 39 on each sign will also have a guard member 40 at each end for a purpose later to appear.

The opposed plates 14 on the sides 13 also carry transversely alined stub shafts 41 each carrying a small idler sprocket wheel 42, which serves to offset the runs of the respective chains 26 below the sprocket wheels 19 as shown in Figure 2.

Figure 5:
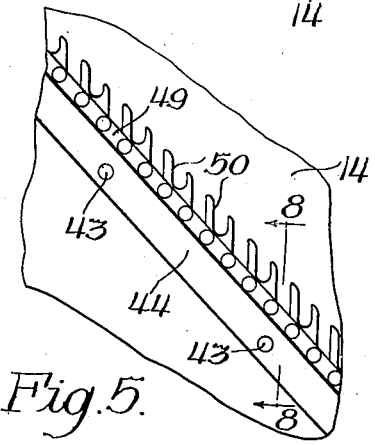
Figure 5 is an enlarged elevational view of a portion of one of the sign storage chains.
Figure 8:
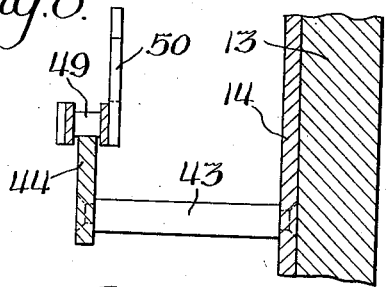
Figure 8 is a sectional view taken along the line 8—8 of Figure 5, looking in the indicated direction.

Each plate 14 as seen in Figures 2, 5 and 8 carries an inclined row of spaced laterally extending studs 43 which serve to carry inclined guide bars 44. At the forward, lower end of these opposite bars 44, the side plates 14 carry a rotatable, transverse shaft 45 which at each end carries a sprocket wheel 46. At the upper end of the guide bars 44, said plates 14 respectively carry parallel, rotatable stub shafts 47 which are transversely alined and respectively carry thereon idler sprocket wheels 48. These shafts 47 turn and the sprocket wheels 48 are fast thereon. Thus, at each side and adjacent the bars 44 is a pair of sprocket wheels 46 and 48. Trained around each said pair of sprocket wheels is an endless, roller type chain 49, the upper run of which drags on the upper edge of the respective guide bar 44 as shown in Figure 8. The inside bar of each chain link of the chains 49 rigidly carries at an acute angle to the chains, an upstanding U-shaped saddle member 50, said members on the opposed chains 49 alining transversely in pairs to receive the ends of the rods 39 to carry the signs 38 loosely on a hanging, pendant pack as shown in Figure 2. The guards 40 on the signs keep the signs laterally positioned in the pack by abutting the supports 50 and preventing too much endwise movement.

The shaft 45 at one end only, has fast thereon a Geneva wheel 51 having concave peripheral portions and radial slots as shown. When this wheel is turned clockwise as viewed in the drawings, the sprocket wheels 46 on the shaft 45 are turned to move the upper runs of the storage chains 44 forwardly and downwardly to advance the signs 38 forwardly toward the front wall 11. The shafts 24 and wheels 25 run intermittently as will later appear and this Geneva wheel 51 is positioned proximate one of said wheels 25 to cooperate with a blank wheel 52 made fast to turn with said shaft 24. This wheel 52 has a radial extension 53 carrying a drive pin 54 which cooperates once each revolution of the wheel 52 to engage in a radial slot of the Geneva wheel 51 and advance a one-fifth of a revolution. This similarly moves the sprocket wheels 46 and the chains 49 a distance just sufficient to present the foremost sign 38 to a position where as the chains 26 move upwardly inside the front wall of the cabinet, and in a vertical plane between the ends of the storage chains 49, their carriers 37 will be in position to pick up the sign and move it to a display position behind the opening 12 which is set back from the front wall 11. The Geneva wheel 51 and driver wheel 52 are so related to each other that the signs will be fed forwardly in an intermittent manner, one at a time, at the desired intervals.

A ratchet wheel 55 is made fast to shaft 24 at one end and a stop dog 56 is pivoted to the adjacent plate 14 by a pin 57, said dog engaging the teeth of the wheel 55 to prevent back lash of the shaft 24. The proximately positioned stop pin 58 serves to retain the dog 56 in proper cooperative position relative to the wheel 55.

Figure 1:
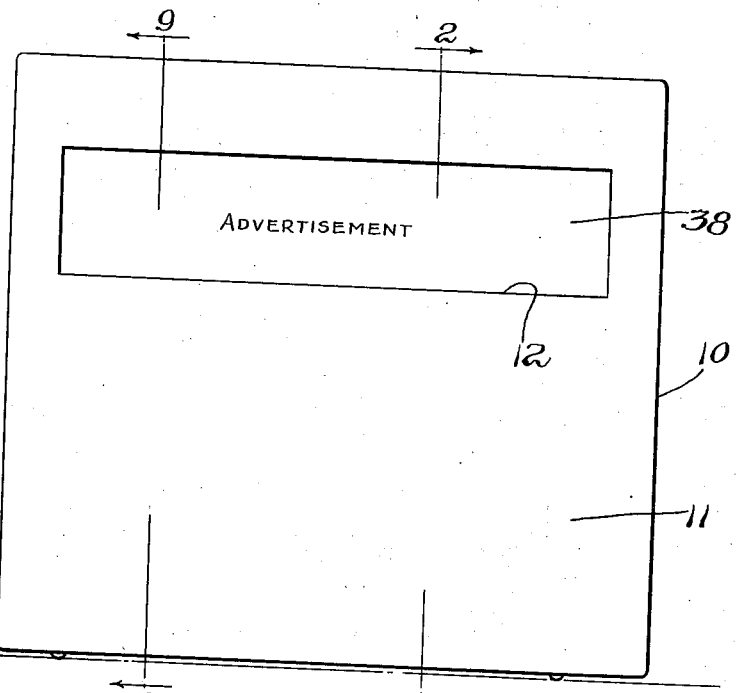
Figure 1 is a front elevational view of a cabinet having a display opening, the exhibitor mechanism being housed in said cabinet.
Figure 3:
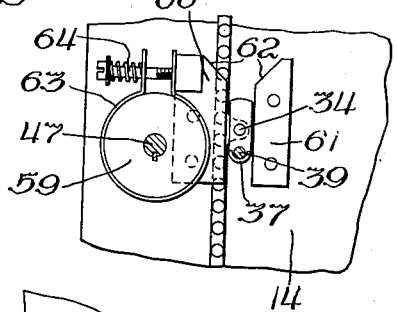
Figure 3 is an enlarged elevational view of a brake and guide structure.
Figure 4:
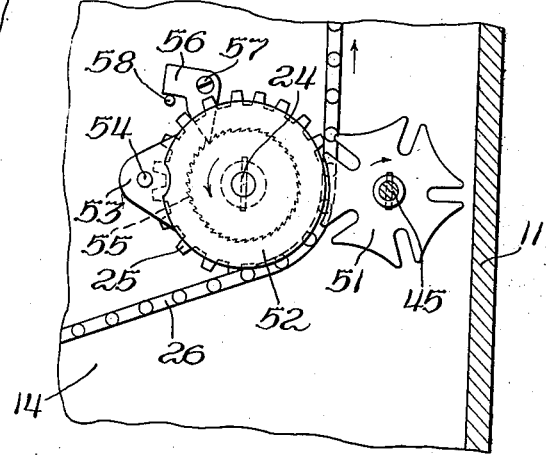
Figure 4 is an enlarged elevational view of a drive control mechanism for the sign carrying and displaying conveyer chains.

Each stub shaft 47 as shown in Figure 3 has a brake wheel 59 keyed thereon. The adjacent wall plates 14 carry a block 60. A complementary block 61 is positioned similarly, and in spaced relation to the block 60, said two blocks having tapered portions 62 at their top ends and being spaced apart to provide a vertical guide passage for the chains 26. This passage, and the blocks serve to aline the hinged carriers 35 so that at this point in the travel of the chains 26, the carriers 35 will hang straight down and hold a sign 38 carried thereby in true, vertical hanging position.

Associated with each brake wheel and in wrapping engagement therewith, in hose clamp fashion, is a brake band 63 supported by the blocks 60 respectively, and adjustable by respective screw bolts 64 in an obvious manner. These brakes can be adjusted to grip the wheels 59 the desired amount to place a drag on the shafts 47, wheels 48 and storage conveyer chains 49, so that the latter weighted down by a load of signs cannot slip downwardly and forwardly toward the front wall 11 because of the incline of the said conveyer chains 49.

Figure 9:
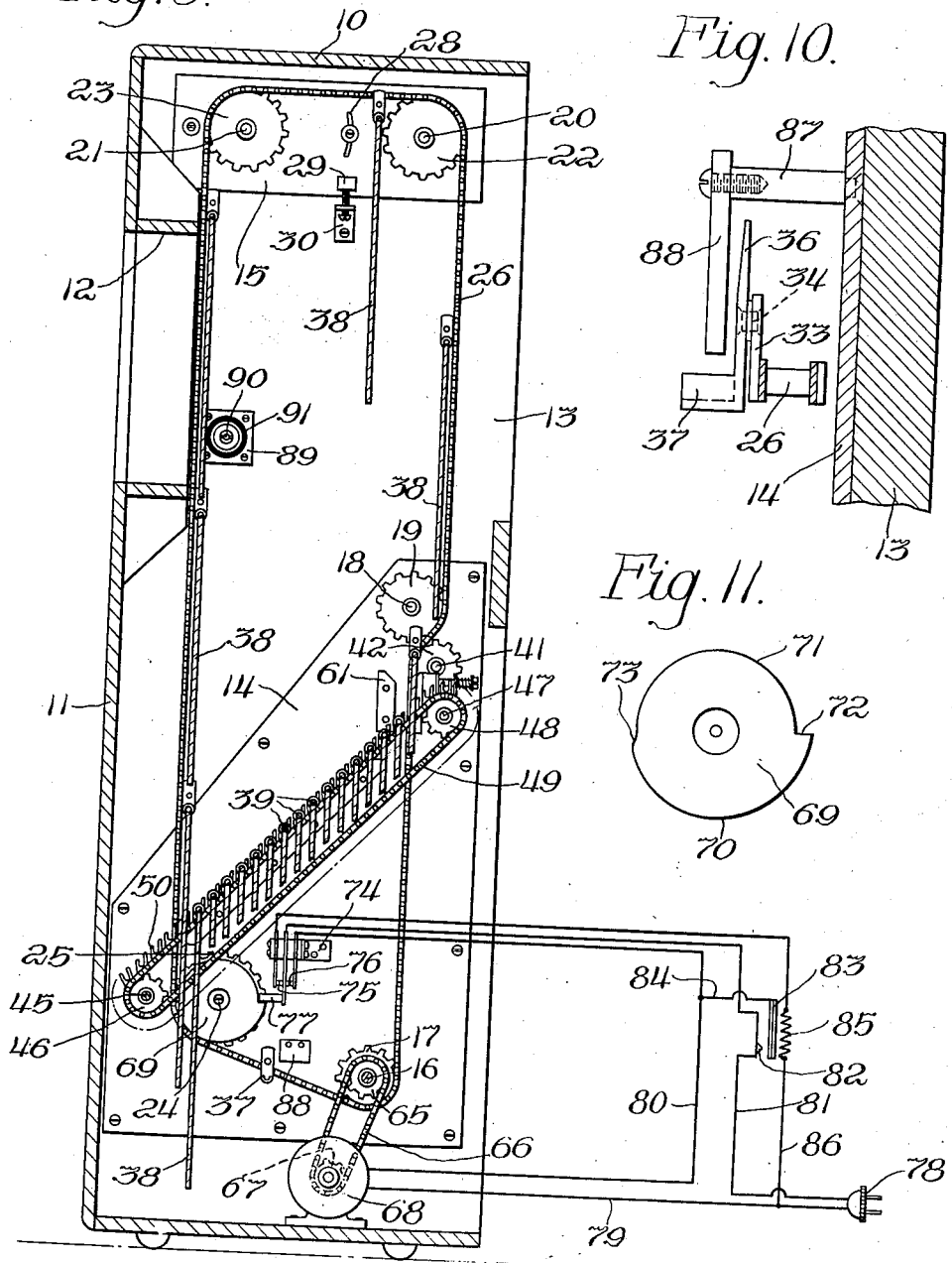
Figure 9 is a side sectional view similar to Figure 2 but showing the opposite side taken along the line 9—9 of Figure 2, looking in the direction of the arrows.

The main drive shaft 16 as seen in Figure 9 carries fast thereon a small sprocket wheel 65 driven by a chain 66 and a sprocket wheel 67 fast on the shaft of an electric motor 68 mounted in any suitable manner on the floor of the cabinet 10.

Figure 11:
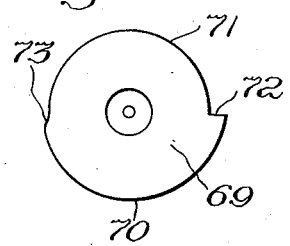

Adjacent one sprocket wheel 25 on a stub shaft 24 is made fast to said shaft a cam wheel 69 having about half of its periphery formed with a high portion 70 and the other half with a low portion 71. At one point of the wheel periphery is a drop off notch 72 and diametrically opposite thereto is a hump 73, as shown best in Figure 11. Proximate to said cam wheel a wall 13 or plate 14 carries an insulated bracket 74 for mounting a triple blade switch comprising two contact switches 75 and 76. (See Figure 9.) The intermediate blade is longest and carries an insulated block 77 riding the cam wheel periphery.

A source of electrical energy is indicated by a plug 78 and a wire 79 goes therefrom to one side of the motor 68. Another wire 80 goes from the motor to one side of contact switch 76. A wire 81 goes from plug 78 to the middle blade of the switches, which blade carries the block 77. In the wire 81 is a contact 82 adjacent a bimetallic, thermostatic member 83 in turn disposed in a lead 84 connecting to wire 80 and positioned adjacent a resistance 85 in a wire 86 connected between wire 79 and the outer blade for contact switch 75, as shown in Figure 9.

Figure 10:
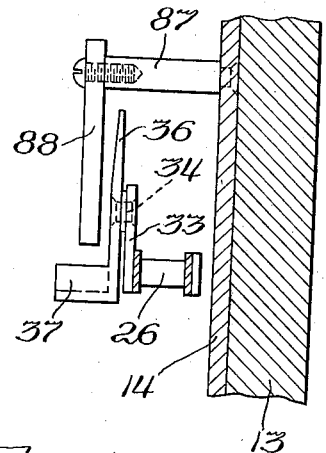
Figure 10 is an enlarged elevational detail view showing a carrier member straightening means; and, Figure 11 is a face, detail view, on an enlarged scale, of a motor control timer cam.

As seen in Figures 9 and 10 each plate 14 carries by means of supports 87 a pendant rigid block 88 so positioned adjacent the lower run of the respective chains 26 that the blocks may be abutted by an inverted carrier 37 to hinge same to its proper pendant position for properly receiving the signs in an obvious manner. In other words, these blocks 88 are respectively positioned in the paths of movement of the carriers 37 on the chains 26 to insure that these carriers will hang down in their proper sign receiving positions just before they move upwardly to engage the ends of and pick up the foremost sign at the low end of the chains 49.

Each side wall 13 carries a bracket 89 adjacent the side edges of the display window 12, said brackets respectively carrying transverse pins 90 for mounting rubber edged rollers 91 positioned to bear against the back side of a sign 38 when it is at the display opening to hold it in proper vertical position to be displayed. This completes the detailed description of the parts and the mode of operation thereof will now be described.

The sign storage chains 49 will have their upper runs, in the support brackets 50 loaded with the signs 38, as shown, so that they hang loosely therefrom in a pendant pack. The weight of these signs may be considerable and therefore the respective brakes 63 will be adjusted to keep the support chains 49 from slipping with the signs since the runs thereof slope forwardly and downwardly. The foremost sign 38 thus hangs behind the front wall 11 of the cabinet and in a vertical plane slightly behind the display opening 12. The plug 78 connects to a source of energy for operating the motor 68. In the position of the parts shown in Figures 2 and 9 a sign 38 has been taken by elements 37 on chains 26 from the front low end of the storage chains, the sign having been brought to a position of rest behind the display window 12. Of course, as the shaft 16 is turned from the motor, the shafts 24 also were turned by chains 26. The cam wheel 69 also turned and at the instant the block 77 drops into the notch 72 the main motor switch 74 was opened to stop the motor and drive to chains 26. Consequently a sign is held stationary behind the window. However, as switch 74 opened, switch 75 naturally closed, causing resistance 85 to heat and close thermoswitch 82, 83 whereupon a motor circuit is complete after a time lag causing same to drive the chains 26 and wheel 69 again. Presently the notch 73 engages the block causing the switch 75 to open but at the same instant the high half of the cam wheel closes the switch 76 to keep the main motor circuit closed and the motor operative. In this fashion the chains 26 run and stop intermittently, picking up signs from the front low end of the chains 49 and returning them to the high rear end thereof.

The opposite sprocket wheel 25 to the one next the cam wheel 69, turns the driver wheel 52 and pin 54 for intermittently moving the Geneva wheel 51, whereupon it follows that the storage chains are moved step by step to advance the signs forwardly in timed relation to the carrier chains 26 so that the latter, at their front upwardly moving runs, can always through their elements 37, pick up the signs 38.

From the above description it must now be appreciated that an improved sign displaying machine or changeable exhibitor has been provided which achieves all of the desirable objects heretofore recited.

It is the intention to cover all changes and modifications of the example disclosed which do not in material respects constitute departures from the spirit and scope of the invention as hereinafter claimed.

What is claimed is:

1. A changeable exhibitor comprising a cabinet having end walls and a front wall formed with a display opening, opposite forwardly and downwardly inclined endless storage chains carried respectively on said end walls, said chains including means loosely to carry individual signs in a pendant pack, opposite complementary carrier chains supported on the end walls in cooperative relation respectively to said first chains, said carrier chains including means to take signs from the storage chains and move same from the front low end of the pack to display position at said opening and then return the signs to the rear high end of the storage chains, means to drive the storage chains in a manner to advance the signs step by step to the low end of the storage chains, and adjustable brake means associated with the storage chains to prevent same from slipping under the weight of the signs.

2. A changeable exhibitor comprising a cabinet having end walls and a front wall formed with a display opening, opposite forwardly and downwardly inclined endless storage chains carried respectively on said end walls, said chains including means loosely to carry individual signs in a pendant pack, opposite complementary carrier chains supported on the end walls in cooperative relation respectively to said first chains, said carrier chains including means to take signs from the storage chains and move same from the front low end of the pack to display position at said opening and then return the signs to the rear high end of the storage chains, means to drive the storage chains in a manner to advance the signs step by step to the low end of the storage chains, and individually adjustable separate friction means operatively associated respectively with said storage chains to prevent same from slipping under the weight of the sign pack carried thereby.

3. A changeable exhibitor comprising a cabinet having end walls and a front wall formed with a display opening, opposite forwardly and downwardly inclined endless storage chains carried respectively on said end walls, said chains including means loosely to carry individual signs in a pendant pack, means to move the chains and pack of signs intermittently forwardly toward the low end of said chains, and opposite complementary carrier chains supported on said end walls in cooperative relation respectively to said first chains, said carrier chains including means to take signs from the first chains and move the signs successively from the front low end of the pack to display position at said opening and then return the signs to the rear high end of the sign pack on said first chains, the carrier chains having runs offset rearwardly from the rear high end respectively of the storage chains, and guide means respectively carried by the end walls and cooperating with said offset runs of the chains to guide the displayed signs from the carrier chains back onto the high end of the storage chains.

4. A changeable exhibitor comprising a cabinet having a display window and signs stored in a pack in the cabinet, means to remove the signs individually from the pack and carry same to display position at the window, said means comprising endless chains supported respectively at opposite sides of the cabinet, said chains having certain links thereof provided with a pivot pin, a sign carrier saddle member pivotally mounted on each said pin, each saddle member having a lightened tail portion disposed above the pivot pin and a weighted saddle sign receiving portion below said pivot pin, means to drive said chains in unison, and abutment means disposed on the cabinet in the path of said pivoted saddle members to be engaged by the latter to insure their maintaining a pendant vertical position with the weighted end down as the chains move.

5. A changeable exhibitor comprising an upright cabinet having a front wall formed with a window, forwardly and downwardly inclined storage chains carried at the lower end of the cabinet including means individually to support signs in definite spaced relation in a pendant pack, carrier chains carried in the cabinet having means to take signs one at a time directly from the storage chains and move same to display position at said window, and brake means operatively associated with said inclined storage chains to prevent the load of signs carried thereby from slipping the said latter chains.

THOMAS C. FLANAGAN.
ARTHUR D. FELL.